United States Patent [19]
Baude

[11] 3,851,559
[45] Dec. 3, 1974

[54] EXPANSIBLE ELEMENT FOR AN ASSEMBLING DEVICE AND DEVICES INCLUDING SAID ELEMENT

[75] Inventor: Lucien Louis Baude, Le Vesinet, France

[73] Assignee: Establissements Joints, Vaduz, Liechtenstein

[22] Filed: Oct. 5, 1972

[21] Appl. No.: 295,325

Related U.S. Application Data
[63] Continuation-in-part of Ser. No. 91,428, Nov. 20, 1970, abandoned.

[30] Foreign Application Priority Data
Nov. 26, 1969 France ............................. 69.40780
Nov. 17, 1970 Great Britain .................... 54704/70

[52] U.S. Cl. ............................. 85/64, 85/71, 85/72, 85/87
[51] Int. Cl. ............................................. F16b 13/06
[58] Field of Search ............... 85/63, 64, 66, 67, 70, 85/71, 72, 77, 86, 87, 88; 15/35

[56] References Cited
UNITED STATES PATENTS
| | | | |
|---|---|---|---|
| 768,283 | 8/1904 | Jenkins | 85/64 |
| 1,201,496 | 10/1916 | Peirce | 85/64 |
| 1,212,298 | 1/1917 | Weston | 85/64 |
| 1,307,418 | 6/1919 | Raeger | 85/64 |
| 2,102,495 | 12/1937 | England | 151/35 |
| 2,559,833 | 7/1951 | Stellin | 151/35 |
| 2,914,983 | 12/1959 | Kopf et al. | 85/71 |
| 2,950,602 | 8/1960 | Lang | 85/64 |
| 3,091,990 | 6/1963 | McVittie | 85/67 |
| 3,381,567 | 5/1968 | Askey | 85/75 |
| 3,727,901 | 4/1973 | Textrom | 85/64 |

FOREIGN PATENTS OR APPLICATIONS
| | | | |
|---|---|---|---|
| 601,453 | 5/1948 | Great Britain | 85/72 |
| 1,008,782 | 11/1965 | Great Britain | 85/67 |
| 1,533,353 | 6/1968 | France | 85/70 |

*Primary Examiner*—Marion Parsons, Jr.
*Attorney, Agent, or Firm*—Sughrue, Rothwell, Mion, Zinn & Macpeak

[57] ABSTRACT

A radially expansible hollow cluster of helical filaments temporarily held together by their very helical shape.

The cluster is included in an assembling device for assembling at least two parts. The cluster extends through aligned apertures in the parts and projects beyond the outer faces of the parts in the form of spread filaments as a result of axial compression of the cluster by a bolt and nut device, the device extending through the cluster and bearing against the opposite ends of the cluster. A stop washer having blocking teeth may be interposed between the cluster and the nut or the head of the bolt.

10 Claims, 17 Drawing Figures

PATENTED DEC 31 1974

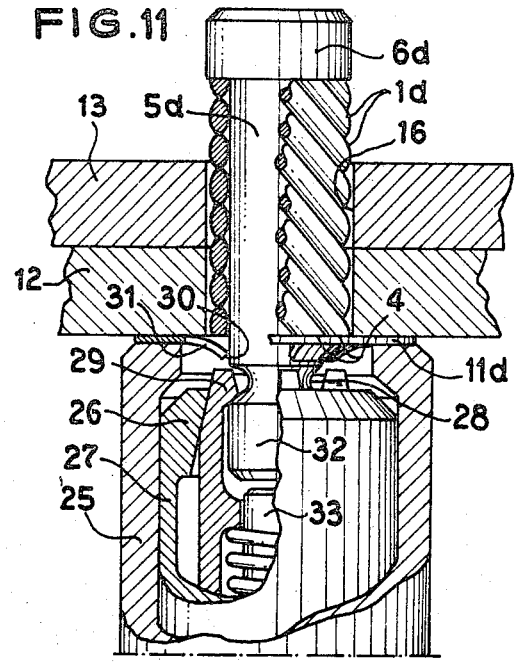
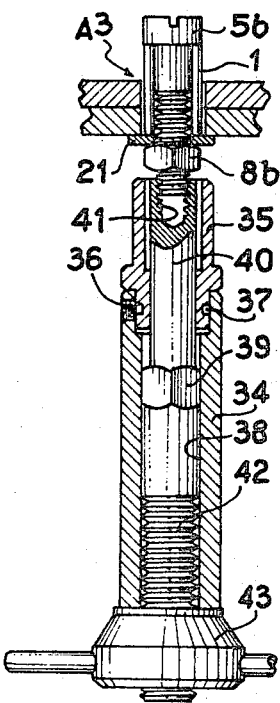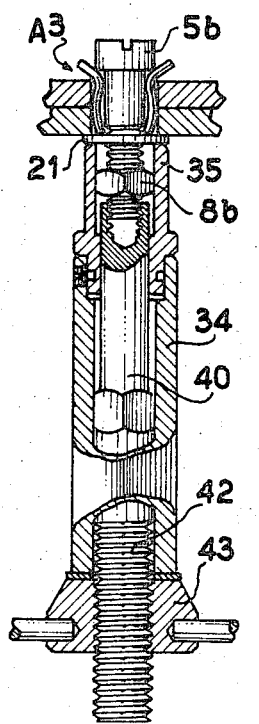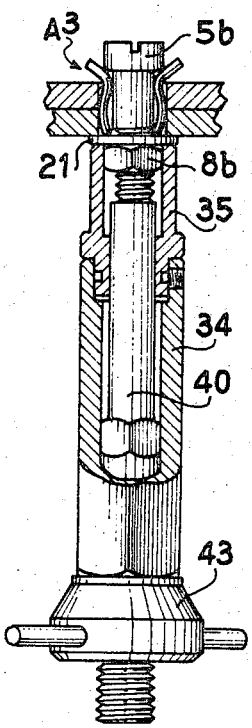

EXPANSIBLE ELEMENT FOR AN ASSEMBLING DEVICE AND DEVICES INCLUDING SAID ELEMENT

This application is a continuation-in-part of my application Ser. No. 91,428 filed on Nov. 20, 1970, and now abandoned.

The present invention relates to devices for assembling parts, walls, machine parts or other elements, and in particular to devices for assemblies in which one of the faces of the unit obtained is not directly accessible.

Many devices have been proposed for constructing such assemblies, but they usually comprise parts which are relatively complicated to produce and/or can only be used with specially adapted tools. Moreover, it is often necessary to apply the parts to be assembled closely against each other just before assembly if no clearance is to exist therebetween.

Above all, as it is the case in U.S. Pat. No. 3,091,990, they only allow a radial clamping or tightening, by expansion, in a very small part of their length which, for a given axial tightening, considerably reduces the resulting wrench resistance.

Further, U.S. Pat. No. 2,914,983 discloses an assembling device wherein a sleeve is engaged on a rod between two radial tightening surfaces. The sleeve is provided with axial slots over a part of its length so as to allow the radial expansion. However, this sleeve is very difficult to manufacture and can not be made at low cost. Further, again, the expansion forces can not bear over the hole length of the sleeve since the parts formed between the axial slots must be held together by continuous cylindrical parts at the ends of the sleeve.

The object of the invention is to remedy these various drawbacks of the known art, while allowing the fixing, assembly and/or the clamping together of parts and walls of all types, one of the parts being inaccessible or accessible with difficulty from one of its sides and being such that it is not possible, or not desired, to provide a tapped hole.

The invention provides an assembling device and an expansible element whereby the aforementioned objects are attained, said device comprising in combination a tubular expansible cluster of juxtaposed filaments, said cluster having an axis and two opposed ends and being defined by two coaxial and concentric geometrical envelope-surfaces, one of which surfaces is an outer surface and the other an inner surface, the filaments being of a resiliently flexible crush-resistant material, each filament having the shape of a helix whose axis coincides with the axis of said cluster and extending through at least two thirds of a complete turn of its helix, whereby the filaments are temporarily held together owing to their very helical shape, and means for exerting an axial force of compression on said element, said force exerting means comprising two members having transverse bearing faces perpendicular to said axis of the cluster and capable of bearing against ends of the filaments at said opposed ends of the cluster.

With this arrangement, when the cluster is axially compressed, which reduces the pitch of the helices formed by the filaments, the cluster undergoes, throughout the axial length of the torsade, a uniform radial expansion which is such that the outer surface surrounding the expanded torsade remains concentric with the initial outer envelope-surface of the cluster in the free state.

Further features and advantages of the invention will be apparent from the ensuing description with reference to the accompanying drawings.

Figure 3:
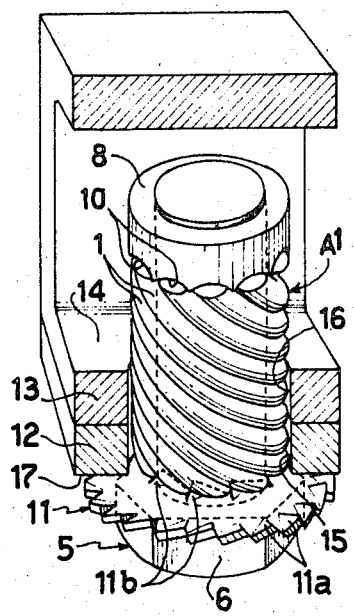
Figure 4:
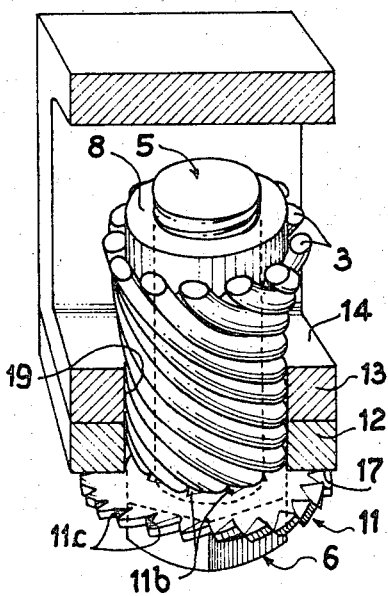
Figure 5:
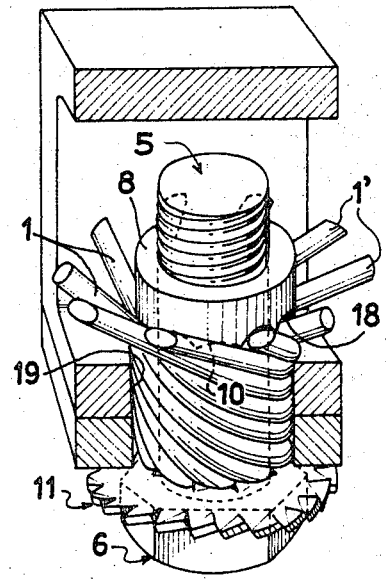
Figure 6:
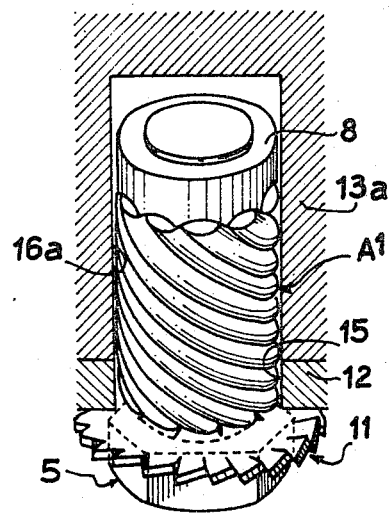
Figure 7:
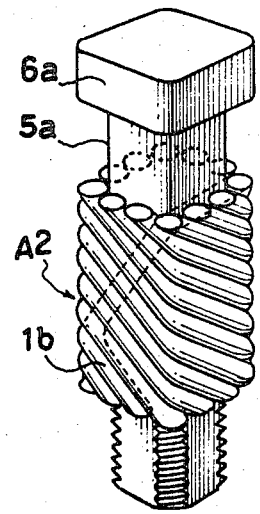
Figure 8:
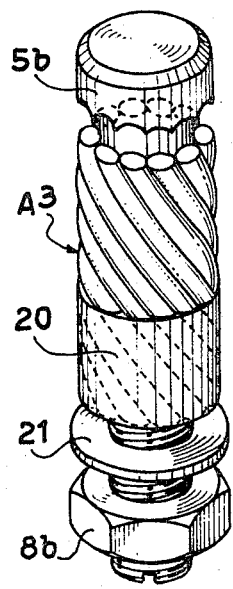
Figure 9:
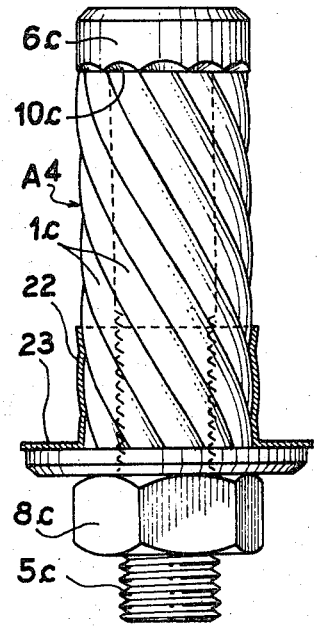
Figure 10:
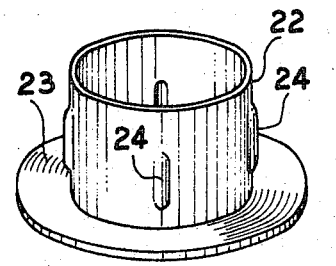
Figure 15:
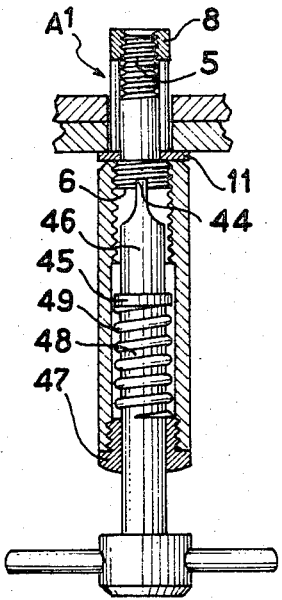
Figure 16:
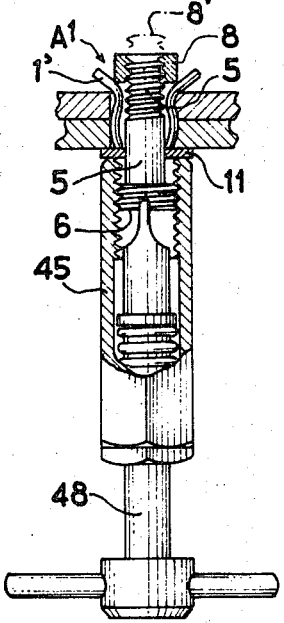
Figure 17:
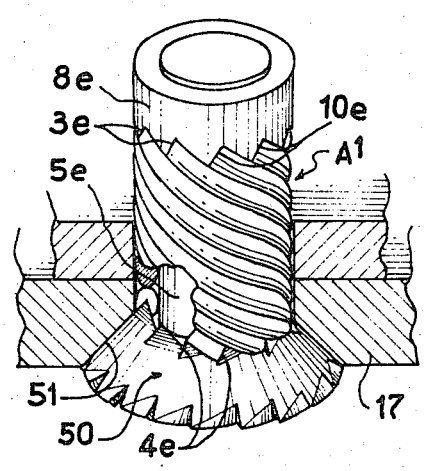

FIGS. 3, 4, and 5 are perspective views, of three different stages of an assembly achieved by means of the assembling device, a portion of the cluster of the assembling device projecting from the accessible side of the assembled assembly or unit;

FIG. 6 is a diagrammatic perspective view of an assembly having a blind aperture;

FIG. 7 is a perspective view, with a part cut away, of a modification of the assembling device;

FIG. 8 is an elevational view, partly in section, of another modification of the assembling device;

FIG. 9 is an elevational partly sectional view of a further modification of the assembling device;

FIG. 10 is a perspective view of a flanged collar of the assembling device shown in FIG. 9;

FIG. 11 is an elevational view, with parts cut away, of an assembling device assembling an assembly having an aperture extending throughout the assembly and a mounting tool for the device;

FIG. 12 is a longitudinal sectional view of an assembling device according to the invention before tightening, the device being combeined with a modification of a specially-adapted mounting tool for the device;

FIGS. 13 and 14 are views similar to FIG. 11 in positions of the assembling device corresponding respectively to an intermediate stage and to the end of the mounting;

FIG. 15 is a longitudinal sectional view of a modification of the assembling device according to the invention before tightening, in which the cluster is spread or expanded by a nut and another modification of the mounting tool;

FIG. 16 is a view similar to FIG. 14 of the fully-mounted assembling device; and FIG. 17 is a perspective view of another modification of the assembling device.

Figure 1:
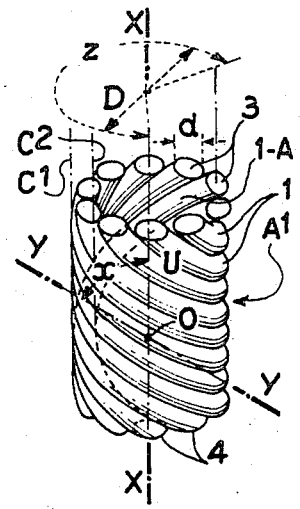
FIG. 1 is a perspective view of an expansible cluster according to the invention.

With reference first to FIG. 1 which shows a preferred embodiment of an expansible element according to the invention, this element comprises a tubular cluster $A^1$ of juxtaposed filaments 1, such as wires or threads, of resiliently bendable material having a certain crush resistance. This material can be, for example, mild steel, spring steel, an aluminium alloy or a superpolyamide such as "Nylon."

The filaments 1 are permanently deformed in accordance with a helix so that the whole of the cluster constitutes a helical torsade interposed between two envelope-surfaces, one of which is an outer surface $C^1$ and the other an inner surface $C^2$ which are coaxial on the axis X—X of the cluster.

The axes, such as Y—Y, of the helical filaments are coaxial helices having as common axis the axis X—X and are at equal distances from the two envelope-surfaces. In the illustrated embodiment, to which the invention is not intended to be limited, the surfaces $C^1$ and $C^2$ are cylindrical and have a circular cross-section and the same is true of the hollow expansible cluster A¹. Note that the juxtaposed filaments are in contact with one another.

At their ends, the filaments 1 terminate in end faces 3 and 4.

It will be understood that, if the cluster A¹ is subjected to an axial force of compression, the helical coils constituted by each filaments tend to flatten in a direction parallel to the axis X—X and consequently tend to increase in diameter. Any axial compression of the cluster therefore results in its radial expansion beyond the surface C¹ of the cluster in the free state.

It will be observed that the angle x of the tangent OT to the helix corresponding to the axis of each filament with respect to an axis OU parallel to the axis X—X of the cluster, is not critical. However, a rough calculation shows that if D is the outside diameter of the cluster in the free state, d the diameter of the filament employed, L the developed length of each filament, F an axial force of compression exerted on the cluster and G the arithmetic sum of the radial forces exerted outwardly by all the filaments on the outer surface C¹ of the cluster, there is obtained:

$$G/F = [2L/D - d)] (1 + \cos x - \sin x)$$

Thus, it can be seen that the ratio G/F, which must be as large as possible for a given length of L, is maximum when $x = \pi/4$. This ratio increases in direct ratio to L. In increasing the length of the cluster A¹, the aforementioned ratio is therefore proportionally increased.

The sleeve, constituted by the expansible cluster A¹ just described, constitutes one of the component parts of an assembling device, one embodiment of which is shown in FIGS. 2–6. This device, shown in the free and exploded state in FIG. 2, comprises, in combination with the cluster A¹ of resilient filaments 1, a tightening rod 5 which is shown in the illustrated embodiment to consist of a bolt whose cylindrical face substantially corresponds to the inner surface C².

The bolt 5 has at one end, adjacent the free end faces 4 of the filaments 1, a hexagonal head 6 whose upper annular face 7 faces the end faces 4 and is plane and perpendicular to the longitudinal axis X—X. The end portion of the bolt remote from the head 6 is screwthreaded for receiving a tightening nut 8 having a transverse annular face 9 for bearing against the end faces 3 of the filaments. The assembling device includes means for preventing the nut 8 from rotating when it is desired to rotate the bolt 5. These means consist in the illustrated embodiment of indentations or impressions 10 formed in the face 9 and a stop washer 11 trapped between the head 6 of the bolt 5 and the bearing faces 4 of the cluster A¹. The stop washer 11 has two series of teeth 11a and 11b respectively provided on the outer and inner peripheral portions of the washer and twisted in such manner as to define edges 11c and 11d which are respectively on each side of the washer, which face in opposite directions and thereby exert locking effects in opposite directions.

It will be observed that, in the free state of the cluster A¹, the outside diameter of the head 6 of the bolt does not exceed substantially the outside diameter D of the cluster.

Figure 2:
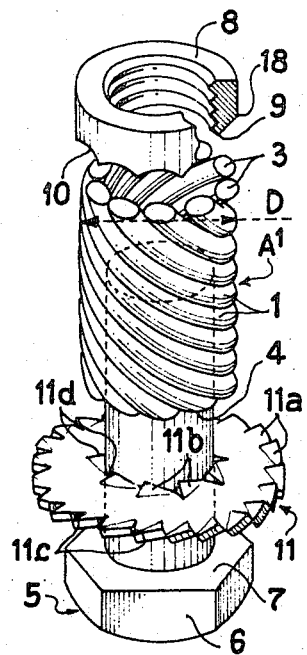
FIG. 2 is an exploded perspective assembly view of an assembling device including the cluster shown in FIG. 1.

According to an essential feature of the invention, the filament of the cluster A¹ are held together owing to the very helical shape of the filaments. Indeed, as shown in FIG. 1, each filament extends through two thirds of a complete turn of its helix or, in other words, the projection z of the axis Y—Y of each helical filament on the plane perpendicular to the axis X—X defines an arc of a circle subtending at the centre an angle of at least 240°. Under these conditions, when the cluster A¹ is engaged on the bolt 5 as shown in FIG. 2, filament connecting means may be omitted. It is even possible to keep the cluster A¹ independent of the bolt 5 if each helical filament extends through a little more than a complete turn about the axis X—X or more. Thus, it is clear that this cluster may be very easily and cheaply manufactured since no connecting means is required between the helical filaments.

FIGS. 3–5 show an application of the tightening device shown in FIG. 2 in the case of the assembly of two parts 12 and 13, it being assumed that the part 13 is inaccessible from its side 14. The two parts have coaxial apertures 15 and 16 whose diameters are slightly greater than the diameter of the cluster A¹. Consequently, the device can be inserted in the assembly or composite aperture, consisting of these coaxial apertures, in the position shown in FIG. 3. The cluster A¹ bears against the teeth 11b of the washer 11 which bears against the head 6 of the bolt 5. The washer 11 is in contact with the accessible side 17 of the assembly, in particular through the teeth 11a.

While the tightening device is maintained in this position, it is sufficient to rotate the bolt 5 by means of a spanner engaged on the head 6 to cause the nut 8 and washer 11 to move closer together and axially compress the cluster A¹ between the transverse faces of the nut 8 and the washer.

This results firstly in a uniform radial expansion of the cluster A¹ throughout its length. The portion of the cluster A¹ located in the aligned apertures 15 and 16 very rapidly bears against the walls of these apertures and automatically creates, under the action of the expanding force produced by the axial compression, a resistance to rotation which thenceforth opposes rotation of the cluster A¹. This resistance to rotation is transmitted to the nut 8 owing to the fact that the faces 3 of the helical filaments 1 enter the impressions 10 in the nut 8 and thus lock it against rotation. The resistance to rotation is enhanced by the locking effect of the washer 11 whose outer edges 11c penetrate the surface and offer a resistance to rotation of the bolt 5 while the inner edges 11d co-operate with the faces 4 of the helical filaments 1 and lock the cluster, these inner edges therefore acting in the opposite direction to the outer edges and thus increasing the resistance to rotation which prevents the cluster from rotating.

The bolt 5 is simply continued to be rotated and, thenceforth, as the portion of the cluster A¹ disposed in the apertures 15 and 16 is held stationary, it is only the portion of the cluster projecting from the inaccessible side 14 of the assembly which continues to undergo a deformation owing to the axial tightening.

The portions of the various helical coils of filament located above this side 14 first elastically bend and can only do this by gradually moving away from the axis X—X, as can be seen in the two successive positions shown in FIGS. 4 and 5.

In the position shown in FIG. 4, the upper faces 3 of the upper free ends of the filaments 1 are still partially in contact with the lower face 9 of the nut 8 but, as the deformation of the filaments progresses, the end faces 3 slide along the face 9 against which they bear until the end faces 3, in moving outwardly beyond the outer surface $C^1$ of the cluster (FIG. 1), move beyong the nut whereupon they allow the nut to move progressively into the inner space of the cluster $A^1$ which allows penetration of the bolt head owing to the separation of the portions of the filaments 1 projecting from the assembly. These portions then assume positions such as those shown in FIG. 5 or, in other words, the cluster $A^1$ is deformed in its free unrestrained portion in a more or less permanent manner, depending on the nature of the material of the filaments, in the form of a more or less frustoconical spread. The portions of the filaments 1 are then wedged between the peripheral edge 18 of the nut and the edge 19 of the aperture 16 of the inaccessible side 14 of the assembly.

Thus, the axial tightening, produced by the screwing of the bolt 5 in the nut 8, results in:

a. a uniform radial expansion of the whole of the portion of the cluster $A^1$ located in the assembly apertures 15, 16 with a uniform resilient tightening pressure against the walls of these apertures;

b. a more or less resilient spreading of the portions 1' of the filaments 1 located between the nut 8 and the inaccessible side or face 14 which constitutes an axial abutment.

The assembly of the parts 12 and 13 is therefore in a positively clamped condition as a result of the clamping of these parts between the washer 11 and the spread portion 1'.

Note that the impressions 10 provided in the nut 8 receive and guide the deformation of the filaments 1 when they spread apart. Consequently, the nut 8 is positively stopped from rotating with respect to the cluster $A^1$ after and this facilitates the unscrewing of the bolt 5 in the event that the assembly must by taken apart.

The scope of the invention is not intended to be limited to the assembly shown in FIGS. 3–5. For example, it must be understood that any number of parts can be assembled, provided that the total length of the assembly aperture through which the assembling device must extend it less than the length of the cluster $A^1$.

It must further be noted that, in the embodiment shown in these FIGS., it is the head of the bolt 5 which produces expansion. However, the scope of the invention incorporates also embodiments wherein positions of the bolt head 6 and the nut 8 are reversed.

Further, it must be understood that the assembling device according to the invention is of utility in assemblies other than those in which the assembly aperture extends right through the assembly. It is of utility in particular in assemblies having a blind aperture when it is not possible, or not desired, to pass through one of the parts of the desired assembly. This is the case, for example, in the arrangement shown in FIG. 6 where the part 12 must be fixed to a part 13a which can have any dimensions and consist for example of a wall of a building (for example a partition wall, wall, or cieling) or the frame of a machine and in which it is only possible to provide a blind aperture 16a, the part 12 continuing to have a coaxial aperture 15 of the same diameter.

In this case, the assembling device is engaged in the assembly aperture (15, 16a) but, in the course of the screwing of the bolt 5 in the nut 8, there is obtained only a uniform radial expansion of the cluster $A^1$ which remains cylindrical and concentric with the shape it had in the free state, this radial expansion merely applying it against the wall of the assembly aperture (15, 16a).

In the embodiments just described, the cluster $A^1$ has a circular cross-sectional shape. However, this shape is not intended to be the only possible shape of the cluster. While the filaments 1 themselves are substantially circular in cross-section, the helical coils of each filament can have any shape in plan, such as an oval or polygonal shape.

Thus, FIG. 7 shows an expansible cluster $A^2$ which has the shape of a square-sectioned prism with rounded corners. The helical axes of the turns or coils of each filament 1a have the same shape in plan and their projection extends through two thirds of the circumference of the cluster $A^2$. In this case, the bolt 5a has a similar shape in both its body portion and head portion 6a. In this embodiment, the screwthreaded portions are restricted to the corners of the end portion of the bolt opposed to the head 6a. In this embodiment, this head is inserted in the aperture of the assembly to be secured and a nut is provided outside optionally with interposition of a washer such as the washer 11 shown in FIGS. 1–6. This inversion of the bolt and nut has of course no effect on the operation of the assembling device which is substantially as described above.

FIG. 8 shows another embodiment of the invention comprising a cluster $A^3$ of helical filaments 1b which are interconnected in at least a part of their length, for example adjacent one of the ends of the cluster, by means capable of yielding upon application of a small force, the connection being just sufficient to permit the handling and mounting of the cluster with no risk of the filaments coming apart prematurely.

This means may yield:

a. by fracture, the means being for example a solder or an adhesive which may form a continuous outer layer 20 or be limited to beads filling the helical recesses between adjacent filaments 1, this solder or adhesive 2 being of brittle nature so that the connection or bond between the filaments is broken when the cluster is subjected to a small radial expanding force;

b. elastically, the connecting means or bond being for example an elastically yieldable adhesive or coating.

The connecting means just described with reference to FIG. 8 is especially advantageous when it is necessary to transport and handle the cluster of filaments independently of the tightening bolts and nuts. This connecting means can of course reinforce the cohesion between the filaments. However, note that this connecting means is in no way essential and, according to an important feature of the invention, merely the coiling of the filaments on at least two thirds of a complete coil or turn is sufficient to hold the filaments together, in particular when the cluster is associated with a bolt and a nut in the as manufactured state.

FIG. 8 also shows that the junction of the bolt 5b and nut 8b are reversed, the head of the bolt $6^b$ having in this case a cylindrical shape which does not exceed the outside diameter of the cluster $A^3$, the nut being in this case hexagonal. In this embodiment, a simple washer 21 is provided which has no teeth and is interposed between the cluster $A^3$ and the nut 8b.

Another modification of the assembling device is shown in FIG. 9 in which the connecting means is constituted by a collar 22 around a portion of a cluster $A^4$ remote from the head 6c of the bolt 5c. This collar is preferably of ductile metal, such as for example brass or tin plate, but may be of a plastics material and surrounds the filaments $1c$ so as to maintain them united in a short portion of their length. This can be easily achieved by a slight expansion of the cluster $A^4$ by an expanding action of the bolt $5c$. For this, it is sufficient that the collar 22 have, in the free state, a diameter very slightly greater than the outside diameter of the cluster $A^4$ in the free state and the bolt $5c$ have a diameter slightly greater than the inside diameter of the cluster in the free state so that introduction of the bolt $5c$ in the cluster $A^4$ previously fitted into the collar 22 results in a slight expansion of this cluster which is sufficient to apply it closely against the collar 22 into which the filaments $1c$ are slightly impressed as shown by the deformation of the collar 22 in FIG. 9.

The collar 22 can be advantageously provided with a flange 23 and can have on its cylindrical body portion a number of outer projections 24 (FIG. 10), for example produced by indentations press-formed in the collar when the latter is of metal.

When the assembling device is engaged in the assembly aperture (15, 16), the collar engages the wall of the aperture with a slight friction through the projecting portions 24 so that, right from the start of the axial tightening of the cluster $A^4$, these projecting portions are impressed into the wall of the aperture and prevent the whole of the assembling device from rotating. This affords an anchorage against rotation of the assembling device in the aperture of the assembly and enables the nut $8c$ to be screwed with no need to provide at the end of the bolt $5c$ a washer such as the washer 11 of the previously-described embodiments shown in FIGS. 1-6.

The head $6c$ of the bolt $5c$ has (FIG. 9) on the edge of its lower plane transverse face indentations or impressions $10c$ in each of which is disposed the upper portion of the corresponding one of the filaments 1 when these filaments are spread to a position similar to that shown in FIg. 5 as a result of the axial tightening, so that bolt $5c$ is positively prevented from rotating relative to the cluster $A^4$. This facilitates the unscrewing of the nut $8c$ should it be necessary to take the assembly apart, as already explained.

In this respect, it will be observed that in all the embodiments, when the tightening causes the filaments to spread to $1'$ (FIG. 5), the filaments, if they are of a material which is harder than that of the part 13 of the assembly and/or that of the head of the bolt, will make an impression in this part and consequently subsequently serve to hold the assembling device against rotation and this will facilitate any subsequent unscrewing of the nut.

In all the embodiments described hereinbefore, the axial tightening element 5, $5a$, $5b$ or $5c$ is a bolt cooperating with a tightening nut. However, it is not intended to limit the scope of the invention to this arrangement and any other means for exerting an axial force of compression on the expansible cluster can be employed.

Thus, in the embodiment shown in FIG. 11, there is employed for this purpose a pulling tool of known type the outer head 25 of which is shown. Movable in the head 25, under the action of a fluid, is a piston 26 which permits radially tightening and then drawing downwardly claws 27. In this case, the tightening element $5d$ is not screwthreaded but has a groove 28 in which hooks 29 on the claws 27 are engaged for exerting a downward traction on the element $5d$ while the head 25 bears against a washer $11d$. The corresponding face of this washer bears against the end faces 4 of the filaments 1.

The washer $11d$ is resiliently yieldable and adapted to be anchored, through inner ends 30 of radial tabs 31, against the smooth body portion of the rod $5d$.

The parts are assembled in the following manner

With the assembling device engaged in the assembly aperture (15,16) the end 32 of the rod $5d$ projecting out of the assembly receives the tool so that the hooks 29 of the claws 27 engage in the groove 28. Then, by downwardly shifting the piston 26 and claws 27, the rod $5d$ is urged downwardly. The head $6d$ axially compresses the cluster $A^4$ whose lower portion is held by the washer $11d$ which is held in position by the tool 25.

As the rod $5d$ moves axially and produces the uniform resilient radial expansion of the portion of the cluster $A^1$ disposed in the assembly aperture and the resilient expansion of the rest of the cluster, the washer $11d$ slides along the rod $5d$ and the inner ends 30 of the tabs 31, in bearing against the rod, act like pawls on the rod and maintain it in position, whenever the force of traction exerted by the tool ceases, in opposition to the resilient action of the cluster which tends to resume its initial shape. At a given moment, the rod $5d$ fractures in the region of the groove 28 so that the groove acts in the manner of a force limiter. The end 32 detached from the rod $5d$ can be ejected from the tool by an ejector 33.

FIGS. 12-14 show another tool which permits, first, exerting an axial traction on the bolt $5b$ (FIG. 8) and, then, screwing the nut 8 to lock the assembling device in the final position producing the radial expansion and spread (FIG. 14).

This tool comprises a prismatic body portion 34 constituting a handle in the end of which is journalled a box spanner 35 engageable on the nut $8b$. The spanner 35 is maintained axially in position by a set screw 36 which is screwed in the body 34 and extends into a groove 37 in the spanner. Further, in the axial aperture 38 of the body, which has a polygonal cross sectional shape, there is slidably keyed a flat-sided portion 39 of a pull rod 40. The upper end of the pull rod has a blind tapped aperture 41 by means of which it can be screwed on the screwthreaded end of the bolt $5b$. A portion of the rod 40 is screwthreaded at 42 and a nut 43 outside the body 34 is screwed on this screwthreaded portion.

The assembling device just described operates in the following manner.

With the nut 43 near the end of the rod 40, the body 34 is rotated about its axis so that the blind tapped aperture 41 of the rod 40 is screwed onto the bolt $5b$ (FIG. 12). Then the nut 43 is screwed onto the rod 40 which is prevented from rotating in the body 34. The latter is prevented from rotating by means of a spanner. The nut 43 rises with respect to the assembly and upwardly urges the body 34 and the box spanner 35 which engages on the nut $8b$ and soon encounters the washer 21. Thenceforth, in continuing to screw the nut 43, which is held axially by its abutment against the body 34, the rod 40 is pulled downwardly. This rod therefore pulls on the rod $5b$ (compare the positions shown in FIGS. 12 and 13) and produces the radial expansion and spreading of the expansible cluster A³ (FIG. 13). The nut 8b which descended with the bolt has now merely to be rotated so as to bring it (FIG. 14) against the washer 21. For this purpose, the spanner 35 is rotated with respect to the body 34 which is continued to be held against rotation.

In all the foregoing embodiments, it is the head of the bolt 5b which produces the expansion of the cluster. However, the scope of the invention is not intended to be limited to this arrangement. The positions of the bolt head and nut can be reversed as shown in FIGS. 1–6 for example.

Thus, in the embodiment shown in FIGS. 15 and 16, the bolt 5 is screwed in a nut 8 which bears against the filaments or rods of the cluster A¹ on the inaccessible side of the assembly and the head 6 of the bolt bears against a washer which may take the form of washer 11 or 21. This head 6 is screwthreaded with the same pitch as the screwthreading of the shank of the bolt and of the nut. The head 6 also has a slot 44.

The assembling device is mounted by means of the illustrated tool. This tool comprises a body 48 which is prismatic or at least has flat outer faces. Its longitudinal aperture has at one end a tapped portion 46 having the same pitch and thread diameter as the head 6 of the bolt. Further, this aperture is closed at its other end by a plug 47 in which is rotatable a screw driver 48 which is engageable in the slot 44 of the bolt in opposition to the action of an opposing or return spring 49.

In FIG. 15, the body 45 has been screwed on the head 6 of the bolt until it is in contact with the washer 11, then the screw driver 48 is engaged in the slot 44 in opposition to the action of the spring 49 and the bolt 5 is prevented from rotating by the screwdriver while the body 45 is continued to be screwed on the head 6 of the bolt by means of a spanner. The bolt therefore descends with respect to the cluster A¹ and washer 11 and draws along the nut 11 without rotating it and this produces the expansion and spreading of the cluster A¹ (FIG. 16). The assembling device has now merely to be locked by screwing the bolt 5 in the nut 8 by means of the screw driver. The nut 8 is prevented from rotating by the spread filaments of the cluster A¹ in position 1'. Thus the bolt rises and its head once again bears against the washer 11 while its screwthreaded shank protrudes at 8' above the nut.

FIG. 17 shows a modification of the assembling device in which the screw or bolt 5e has a countersunk head on which bears a washer 50 which is frustoconical and has a transverse bearing face bearing against the cluster A¹. This arrangement affords an assembling device which is flush with the side or face 17 of the assembly, provided that the assembly aperture is countersunk at 51 to receive the frustoconical washer 50 containing the head of the screw 5e. Note that the washer 50 comprises teeth similar to those of the washer shown in FIG. 2.

Further, the rods or filaments 1 can have (as they may also have in the other embodiments described hereinbefore) end faces 3e, 4e which are inclined to the axis X—X and are, for example, perpendicular, in respect of each filament, to the helical axis of the filament. The corresponding transverse tightening face provided on the nut 8e can have indentations or impressions such as 10e which are formed by a swaging or press operation and open onto the periphery of the nut (and of the washer 9).

Having now described my invention, what I claim as new and desire to secure by Letters Patent is:

1. Assembling device comprising, in combination, a tubular expansible cluster of a plurality of juxtaposed identical filaments having a circular cross-section, said cluster having an axis and two opposed ends and being defined by two coaxial and concentric geometrical envelope-surfaces, one of which surfaces is an outer surface and the other an inner surface, the filaments being of a resiliently flexible crush-resistant material, each filament having the shape of a helix whose axis coincides with the axis of said cluster and extending through at least two thirds of a complete turn of its helix, all the contact lines between adjacent filaments being contained in a single geometrical surface coaxial with said cluster and located between said envelope-surfaces, whereby the filaments are temporarily held together owing to their very helical shape, and means for exerting an axial force of compression on said element, said force exerting means comprising two members having transverse bearing faces perpendicular to said axis of the cluster and capable of bearing against ends of the filaments at said opposed ends of the cluster.

2. Assembling device as claimed in claim 1, wherein each filament extends over at least a full turn of its helix.

3. Assembling device as claimed in claim 1, wherein said force exerting means comprises, in combination, a rod axially engaged in said cluster and having a head, at least one member movable along said rod, the head and the movable member having, in facing relation, said transverse bearing faces perpendicular to said axis of the cluster, and means for axially urging the head and the movable member towards each other and maintaining them in a position closer together for exerting said axial force of compression on said element.

4. A device as claimed in claim 3, wherein the rod and the movable member are respectively a bolt and a nut screwed on the bolt, a washer being provided on the bolt and interposed between the head and the nut, one of said transverse faces being formed on one of two elements consisting of said head and said nut and the other of said transverse faces being formed on said washer which bears against the other of said two elements, the diameter of said washer distinctly exceeding the diameter of said outer envelope-surface.

5. A device as claimed in claim 4, wherein said one of said two elements having said transverse face has on the periphery of the corresponding transverse face indentations in which are engageable the filaments in the vicinity of free ends of the filaments in the course of the spreading of an adjacent portion of the cluster under the action of said corresponding transverse face, whereby said free ends of filaments can leave said indentations and bend outwardly.

6. A device as claimed in claim 4, wherein said washer has two series of teeth respectively provided on the outer and inner peripheral portions thereof said teeth being twisted in such a manner as to define edges which are respectively on each side of said washer and which force in opposite directions to thereby exert locking effects in opposite directions.

7. Assembling device comprising, in combination, a tubular expansible cluster of juxtaposed filaments, said cluster having an axis and two opposed ends and being defined by two coaxial and concentric geometrical envelope-surfaces, one of which surfaces is an outer surface and the other an inner surface, the filaments being of a resiliently flexible crush-resistant material, each filament having the shape of a helix whose axis coincides with the axis of said cluster and extending through at least two thirds of a complete turn of its helix, whereby the filaments are temporarily held together owing to their very helical shape, and means for exerting an axial force of compression on said element, said force exerting means comprising two members having transverse bearing faces perpendicular to said axis of the cluster and capable of bearing against ends of the filaments at said opposed ends of the cluster, said force exerting means comprising, in combination, a rod axially engaged in said cluster and having a head, at least one member movable along said rod, the head and the movable member having, in facing relation, said transverse bearing faces perpendicular to said axis of the cluster, and means for axially urging the head and the movable member towards each other and maintaining them in a position closer together for exerting said axial force of compression of said element, the rod having a smooth portion and a groove adjacent an end of the rod remote from the head, said groove being provided for the temporary engagement of pulling tool means, said groove constituting a region of diminished strength which, by the fracture of the rod in the groove, constitutes a force limiter, the device further comprising a stop washer having tabs adapted to engage and wedge against the smooth portion of the rod.

8. An assembling device comprising, in combination: an expansible element comprising a tubular expansible cluster of juxtaposed filaments, said cluster having an axis and two opposed ends and being defined by two coaxial and concentric geometrical envelope-surfaces one of which surfaces is an outer surface and the other an inner surface, the filaments being of a resiliently flexible crush-resistant material, and joining means capable of yielding upon application of an axial force tending to radially expand the cluster and of maintaining the filaments temporarily assembled with each other, each filament having, in at least a part of its length, the shape of a helix having an axis which coincides with the axis of said cluster, a corresponding portion of the cluster constituting a helical torsade, said joining means extending over a part of the length of said cluster whereby a free end region of said corresponding portion is uncovered; and means for exerting an axial force of compression on said element, said force-exerting means comprising in combination a bolt axially engaged in the cluster and having a head and at least a nut screwed on said bolt, said head and said nut having, in facing relation, transverse bearing faces perpendicular to said axis of the cluster, whereby movement of said nut on said bolt urges said transverse bearing faces together for exerting said axial force of compression on said element, a washer being provided on the bolt and interposed between the head and the nut, one of the said transverse faces being formed on one of two elements consisting of said head and said nut and the other of said transverse faces being formed on said washer which bears against the other of said two elements, wherein said one of said two elements having said transverse face has on the periphery of the corresponding transverse face indentations in which are engageable the filaments in the vicinity of free ends of the filaments in the course of the spreading of an adjacent portion of the cluster under the action of said corresponding transverse face.

9. An assembling device comprising in combination: an expansible element comprising a tubular expansible cluster of juxtaposed filaments, said cluster having an axis and two opposed ends and being defined by two coaxial and concentric geometrical envelope-surfaces one of which surfaces is an outer surface and the other an inner surface, the filaments being of a resiliently flexible crush-resistant material, and joining means capable of yielding upon application of an axial force tending to radially expand the cluster and of maintaining the filaments temporarily assembled with each other, each filament having, in at least a part of its length, the shape of a helix having an axis which coincides with the axis of said cluster, a corresponding portion of the cluster constituting a helical torsade, said joining means extending over a part of the length of said cluster whereby a free end region of said corresponding portion is uncovered; and means for exerting an axial force of compression on said element, said force-exerting means comprising in combination a rod axially engaged in the cluster and having a head, at least one member movable along the rod, the head and the movable member having, in facing relation, transverse bearing faces perpendicular to said axis of the cluster, and means for axially urging the head and the movable member towards each other and maintaining them in a position closer together for exerting said axial force of compression on said element, wherein the rod has a smooth portion and a groove adjacent an end of the rod remote from the head, said groove being provided for the temporary engagement of pulling tool means, said groove constituting a region of diminished strength which, by the fracture of the rod in the groove, constitutes a force limiter, the device further comprising a stop washer having tabs adapted to engage and wedge against the smooth portion of the rod.

10. An expansible element for an assembly device comprising a tubular expansible cluster of a plurality of juxtaposed identical filaments having a circular cross-section, said cluster having an axis and being defined by two coaxial and concentric geometrical envelope-surfaces one of which surfaces is an outer surface and the other an inner surface, the filaments being of a resiliently flexible crush-resistant material, each filament having, in at least a part of its length the shape of a helix having an axis which coincides with the axis of said cluster and extending through at least a complete turn of its helix, all the contact lines between adjacent filaments being contained in a single geometrical surface coaxial with said cluster and located between said envelope surfaces, whereby the filaments are temporarily held together owing to their very helical shape.

* * * * *